(12) United States Patent
Muralimanohar et al.

(10) Patent No.: US 11,765,277 B2
(45) Date of Patent: *Sep. 19, 2023

(54) SYSTEM AND METHOD FOR HYBRID NETWORK DATA CONSUMPTION TRACKING IN A WIRELESS NETWORK

(71) Applicant: VERIZON PATENT AND LICENSING INC., Basking Ridge, NJ (US)

(72) Inventors: Madhan Muralimanohar, Tampa, FL (US); Violeta Cakulev, Millburn, NJ (US); Muthukumar Retnasamy, Tampa, FL (US); Hans Raj Nahata, New Providence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,114

(22) Filed: Aug. 3, 2022

(65) Prior Publication Data
US 2022/0377182 A1 Nov. 24, 2022

Related U.S. Application Data

(63) Continuation of application No. 17/213,442, filed on Mar. 26, 2021, now Pat. No. 11,438,463.

(51) Int. Cl.
*H04M 15/00* (2006.01)
*H04W 4/24* (2018.01)
*H04W 88/06* (2009.01)
*H04W 76/20* (2018.01)

(52) U.S. Cl.
CPC ........... *H04M 15/66* (2013.01); *H04M 15/60* (2013.01); *H04W 4/24* (2013.01); *H04W 76/20* (2018.02); *H04W 88/06* (2013.01)

(58) Field of Classification Search
CPC .. H04M 15/66; H04M 15/60; H04M 15/8033; H04M 15/8027; H04M 15/8038; H04M 15/8228; H04W 4/24; H04W 76/20; H04W 88/06; H04L 12/1407
USPC ......................................................... 455/405
See application file for complete search history.

(56) References Cited

U.S. PATENT DOCUMENTS

2020/0267802 A1* 8/2020 Engelhart ............. H04M 15/71
2020/0404105 A1* 12/2020 Kim ..................... H04M 15/70

FOREIGN PATENT DOCUMENTS

WO WO-2020072257 A1 * 4/2020 ......... H04L 65/1006

* cited by examiner

*Primary Examiner* — Huy C Ho

(57) ABSTRACT

Disclosed are systems and methods for intelligent, real-time network consumption tracking and traffic steering in fifth-generation (5G) networks via a network configuration and implementation. The disclosed hybrid network traffic steering is effectuated by using Diameter Routing Agent (DRA) and Subscriber Location Function (SLF) to route/steer fourth-generation (4G) network traffic by 5G subscribers to a 5G Charging Function (CHF) for 4G fallback network consumptions. Network currency consumption tracking is performed by the 5G CHF. The CHF dictates policy rules for 5G networks via the Policy Control Function (PCF) of the 5G Core, and dictates policy rules for 4G networks via the Policy and Charging Rules Functions (PCRF) for fallback sessions.

20 Claims, 8 Drawing Sheets

US 11,765,277 B2

SYSTEM AND METHOD FOR HYBRID NETWORK DATA CONSUMPTION TRACKING IN A WIRELESS NETWORK

CROSS REFERENCE TO RELATED APPLICATIONS

This application is a continuation of, and claims priority from, co-pending U.S. patent application Ser. No. 17/213,442, filed Mar. 26, 2021, entitled SYSTEM AND METHOD FOR HYBRID NETWORK DATA CONSUMPTION TRACKING IN A WIRELESS NETWORK, the contents of which are hereby incorporated by reference.

BACKGROUND INFORMATION

With the increased availability of fifth-generation (5G) networks, network providers are currently deploying network functions to provision subscribers (or users, used interchangeably) to both fourth-generation (4G) networks and 5G networks. However, the limits in the networks' configurations and the provisioning to both 4G and 5G networks, as well as the computational deficiencies available under standard-based network functions may lead to less than optimal coverage and/or a reduction of the accuracy of data consumption being tracked.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

Figure 1:
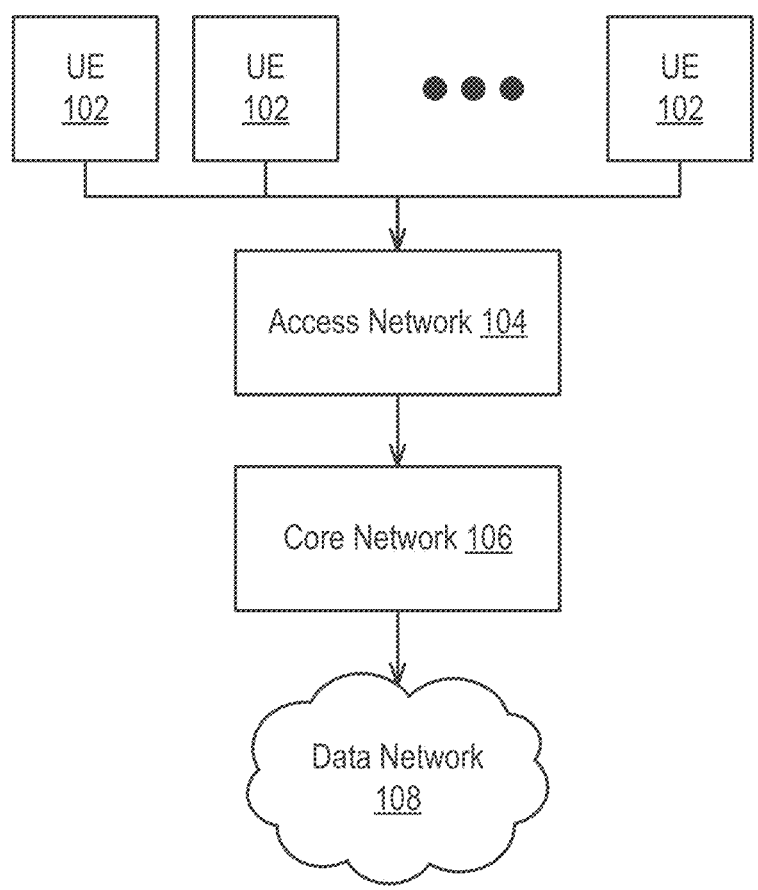
FIG. 1 is a block diagram of an example network architecture according to some embodiments of the present disclosure.

Managing subscribers network data consumption in two different networks, inclusive of tracking and monitoring activity with and between each networks elements and functions, may lead to problems with network tracking capabilities. Currently, network providers provision subscribers' network service for both 4G and 5G networks (e.g., 4G Core and 5G Core, respectively).

For example, when a 5G beam is steered to a subscriber, and it is determined that the subscriber is either: i) out of range (e.g., the 5G Radio/RAN is unavailable); and/or ii) the 5G Core and Edge Network is unavailable to handle the subscriber's session, the provider may switch to providing the subscriber with 4G network functionality. This is referred to as a "fallback" session. The consumptions for that fallback session are routed from the 4G network elements to the 5G network elements.

Conventional network configurations bifurcate a subscriber's network experience based on network currency consumption counters and subscriber policy rules that are specific to 4G and 5G networks. The network consumption currency counter is split between a 4G Online Charging Function (OCS) at a rate of X % and a 5G Charging Function (CHF) at a rate of Y %. For 4G networks, subscriber policy rules are managed by Policy and Charging Rules Functions (PCRF) using the OCS (e.g., "policy and charging" is managed by PCRF and OCS). For 5G networks, subscriber policy rules are managed by Policy Control Functions (PCF) using the CHF (e.g., "policy and charging" is managed by PCF and CHF). This bifurcated network experience may lead to a degraded quality of service (QoS), which may occur if either the 4G network's or 5G network's currency consumption counter is exhausted.

Conventional 4G/5G network availability is based on externally-based systems that enact custom rules to separate 4G network data consumptions by 5G subscribers. Current 4G and 5G networks utilize different network elements for managing and allocating their respective network currency consumption counters. This leads to a buffered and delayed tracking of network currency consumptions for a subscriber (e.g., non-real-time), and requires a periodic reconciliation and synchronization in order to maintain the accuracy between the elements of the 4G and 5G networks.

To solve the aforementioned and other problems, the disclosed systems and methods provide a network configuration and implementation for network traffic steering. According to embodiments of the present disclosure, the disclosed network traffic steering may be implemented by using a Diameter Routing Agent (DRA) and/or a Subscriber Location Function (SLF) to route/steer 4G network traffic by 5G subscribers to 5G CHF for 4G fallback network data consumptions.

For fallback sessions, rather than utilizing the 4G OCS, as in conventional systems, network currency consumption tracking (in 4G) is performed by the 5G CHF. Thus, 4G OCS is not required. The disclosed systems and methods may provide for intelligent, real-time network consumption counter management by and between 4G and 5G networks through the internal elements of the 5G network (e.g., the CHF). In some embodiments, the CHF may dictate policy rules for 5G networks via the PCF, and may dictate policy rules for 4G networks via the PCRF.

FIG. 1 is a block diagram of an example network architecture according to some embodiments of the present disclosure. In the illustrated embodiment, user equipment (UE) 102 accesses a data network 108 via an access network 104 and a core network 106. In the illustrated embodiment, UE 102 comprises any computing device capable of communicating with the access network 104. As examples, UE 102 may include mobile phones, tablets, laptops, sensors, Internet of Things (IoT) devices, autonomous machines, and any other devices equipped with a cellular or wireless or wired transceiver. One example of a UE is provided in FIG. 8.

In the illustrated embodiment, the access network 104 comprises a network allowing over-the-air network communication with UE 102. In general, the access network 104 includes at least one base station that is communicatively coupled to the core network 106 and wirelessly coupled to zero or more UE 102.

In some embodiments, the access network 104 comprises a cellular access network, for example, a fifth-generation (5G) network or a fourth-generation (4G) network. In one embodiment, the access network 104 and UE 102 comprise a NextGen Radio Access Network (NG-RAN). In an embodiment, the access network 104 includes a plurality of next Generation Node B (gNodeB) base stations connected to UE 102 via an air interface. In one embodiment, the air interface comprises a New Radio (NR) air interface. For example, in a 5G network, individual user devices can be communicatively coupled via an X2 interface.

In the illustrated embodiment, the access network 104 provides access to a core network 106 to the UE 102. In the illustrated embodiment, the core network may be owned and/or operated by a mobile network operator (MNO) and provides wireless connectivity to UE 102. In the illustrated embodiment, this connectivity may comprise voice and data services.

At a high-level, the core network 106 may include a user plane and a control plane. In one embodiment, the control plane comprises network elements and communications interfaces to allow for the management of user connections and sessions. By contrast, the user plane may comprise network elements and communications interfaces to transmit user data from UE 102 to elements of the core network 106 and to external network-attached elements in a data network 108 such as the Internet.

In the illustrated embodiment, the access network 104 and the core network 106 are operated by an MNO. However, in some embodiments, the networks (104, 106) may be operated by a private entity and may be closed to public traffic. For example, the components of the network 106 may be provided as a single device, and the access network 104 may comprise a small form-factor base station. In these embodiments, the operator of the device can simulate a cellular network, and UE 102 can connect to this network similar to connecting to a national or regional network.

In some embodiments, the access network 104, core network 106 and data network 108 can be configured as a multi-access edge computing (MEC) network, where MEC or edge nodes are embodied as each UE 102, and are situated at the edge of a cellular network, for example, in a cellular base station or equivalent location. In general, the MEC or edge nodes may comprise UEs that comprise any computing device capable of responding to network requests from another UE 102 (referred to generally as a client) and is not intended to be limited to a specific hardware or software configuration a device.

Figure 2:
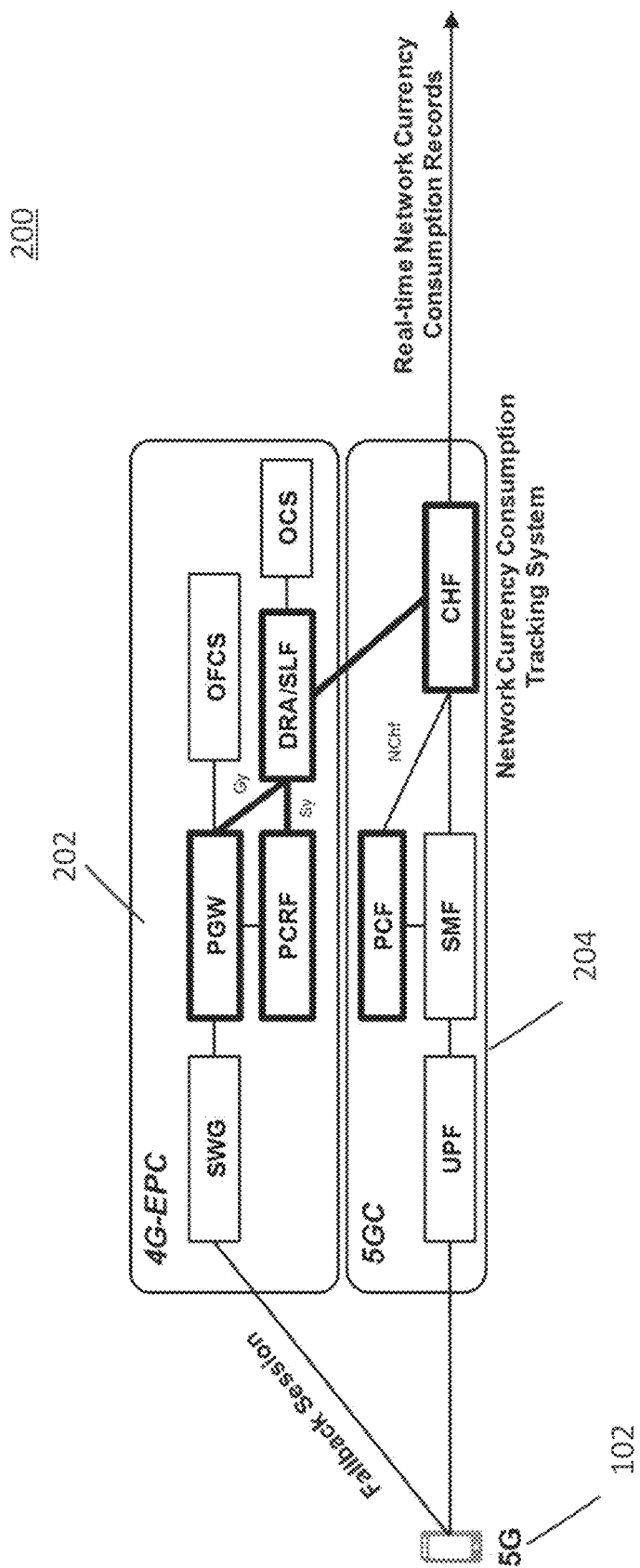
FIG. 2 illustrates an example embodiment of network data consumption tracking and policy management architecture according to some embodiments of the present disclosure.

In FIG. 2, system 200 is illustrated and provides a non-limiting example embodiment of network data consumption tracking and policy management architecture according to some embodiments of the present disclosure. As discussed in relation to FIG. 2, and below in relation to FIGS. 3-7, system 200 is a hybrid network traffic steering system that eliminates the need for executing a dual-mode 4G and 5G connectivity for a subscriber, and further eliminates the need for the usage and reliance on the OCS and OFCS of the 4G Core when executing a fallback session. Moreover, system 200 eliminates the need and reliance on the external system for computing consumption records, thereby enabling a real-time tracking of network currency consumption for subscribers.

System 200 depicts UE 102, 4G Core 202 and 5G Core 204. The 4G Core 202 includes, inter alia, Serving GateWay (SGW), Packet GateWay (PGW), PCRF, OCS and Offline Charging Function (OFCS). In system 200, the 4G Core 202 is modified to further include a Diameter Routing Agent/Subscriber Location Function (DRA/SLF) component. The DRA/SLF of the 4G Core 202 is in communication with the CHF of the 5G Core 204.

The 5G core 204 includes, inter alia, user plane function (UPF), session management function (SMF), PCF and CHF. In system 600, the 5G Core 204 is modified to be able to directly communicate with the DRA/SLF of the 4G Core 602.

The configuration of system 200, particularly the interplay between the CHF and the DRA/SLF of the 4G Core 202, enables system 200 to provide for network data consumption tracking both 4G and 5G networks by the CHF using DRA/SLF based traffic steering (e.g., traffic steering based on international mobile subscriber identity (IMSI) and/or MDN). This configuration enables network data consumption tracking to be performed within the network in a real-time manner by the CHF, and as a result, no external system is required for tracking either 4G or 5G activity of subscribers.

Figure 3:
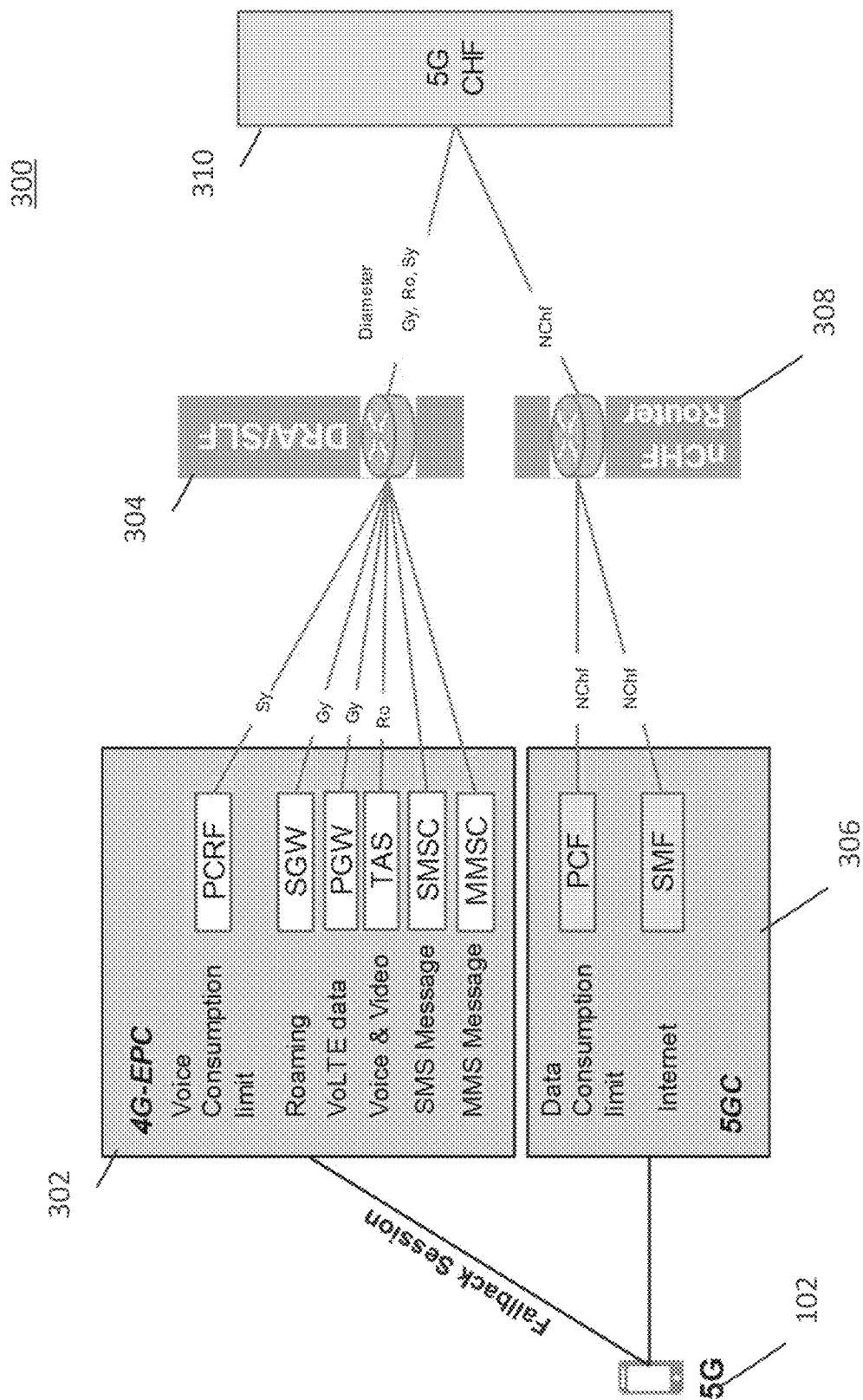
FIG. 3 illustrates an example embodiment of the network data consumption tracking and policy management architecture according to some embodiments of the present disclosure.

FIG. 3 depicts system 300, which is a further example of system 200 and provides additional details that illustrate the components and configuration of the instant disclosure.

System 300 depicts UE 10202, 4G Core 302, DRA/SLF 304, 5G Core 306, nCHF Router 308 and 5G CHF 310. As illustrated, the 4G Core 302 includes functionality for, but is not limited to, voice consumption limits, roaming, Voice over LTE (VoLTE) data, Voice and Video, SMS messaging and MMS Messaging, which are provided by components that include, but are not limited to, PCRF, SGW, PGW, Telephony Application Server (TAS), short message service center (SMSC) and multimedia messaging service (MMSC).

According to some embodiments, the components of the 4G Core 302 communicate their respective information to the DRA/SLF 304. For example, as discussed below, the PCRF communicates data referenced as Sy; SGW and PGW, respectively, communicate data referenced as Gy; and TAS communicate data referenced as Ro. In some embodiments, the DRA/SLF 304 implements 3GPP diameter signaling of the received data (e.g., Gy, Ro, Sy), and communicates with the 5G CHF 310 (e.g., sends and receives data from the CHF).

In system 300, the PCRF is provisioned with 5G subscribers as online only consumption tracking. In some embodiments, PCRF provides online consumption tracking to PGW; PGW routes the traffic using Gy interface to DRA; PCRF interfaces with DRA to obtain the consumption limit details from CHF using diameter interface (Sy); and DRA identifies the instance of CHF using SLF.

With regard to TAS (e.g., IP Multimedia Subsystem (IMS) Core), in system 300, 5G subscriber profiles are provisioned in a TAS repository with online only consumption tracking. In some embodiments, TAS routes the traffic to DRA for all 5G subscriber voice calls based on MDN or IMSI; and DRA identifies the instance of CHF using SLF.

With regard to PGW, in system 300, PGW interfaces with DRA/SLF using diameter interface and sends consumption records to CHF via DRA/SLF.

With regard to DRA/SLF, with its introduction and inclusion to system 300 (and system 200, as mentioned above), DRA/SLF maintains the host information for both 4G OCS and 5G CHF. DRA/SLF routes all 5G subscriber traffic to CHF based on IMSI and/or MDN for consumption tracking.

With regard to CHF, CHF supports 5G Service Based Interfaces (SBI). As shown in system 300, CHF supports diameters: Gy for PGW, Sy for PCRF and Ro for TAS—to interface with DRA. CHF further supports and provides consumption tracking for both 4G and 5G traffic in a real-time manner (e.g., as it is occurring). And, as discussed below in reference to at least FIGS. 4 and 5, consumptions can be bucketed (e.g., stored in hosted or associated data structures) in an individualized or shared manner.

According to some embodiments, the PCF and SMF, respectively, output NChf data to the nCHF Router 308, which is a router interface that provides a service for offline and online charging. The nCHF Router 308's output is then sent to the 5G CHF 310. This configuration enables network data consumption tracking to be performed internally, within the network, in a real-time manner by the CHF (e.g., 5G CHF 310).

Figure 4:
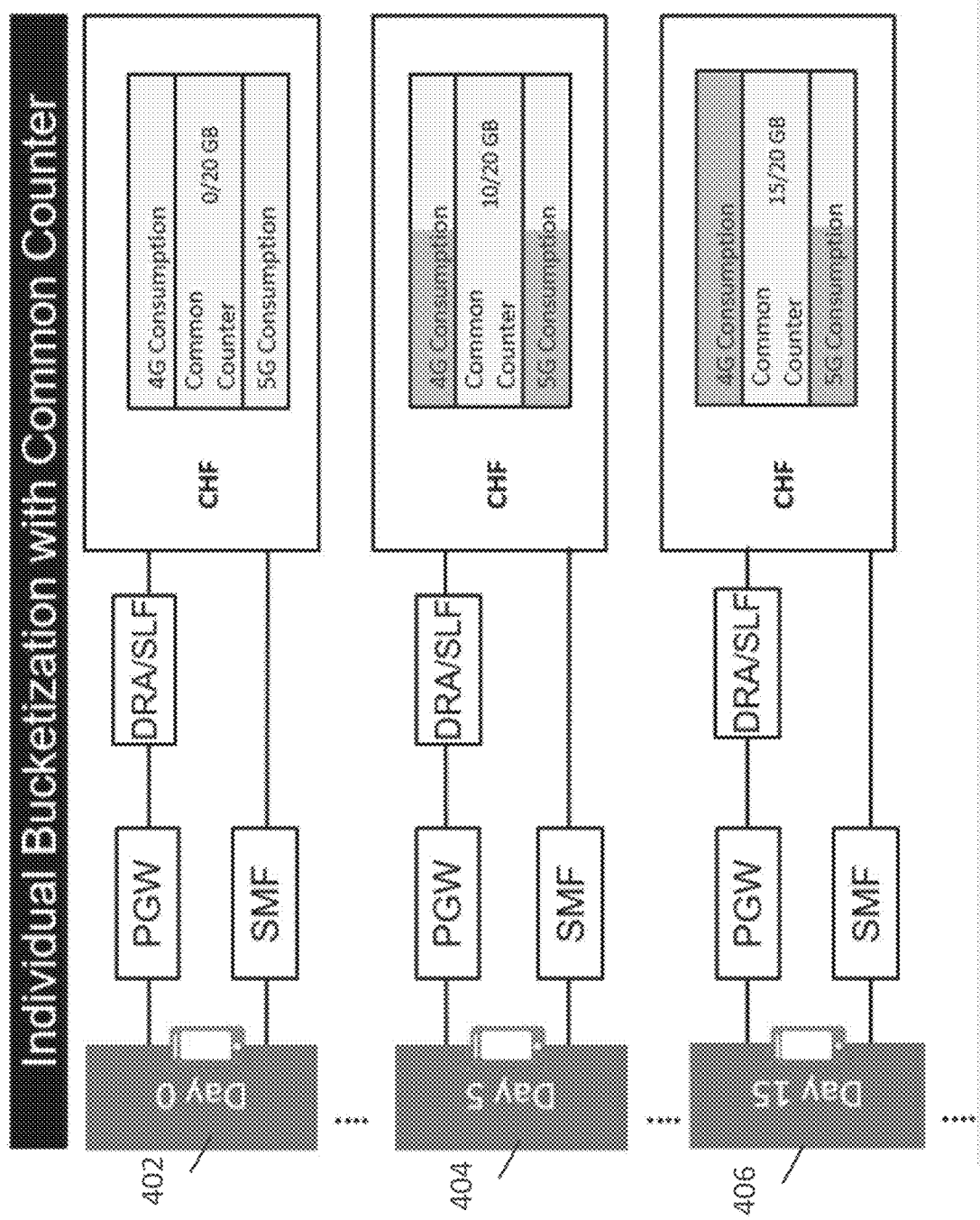
FIG. 4 illustrates an example embodiment of an intelligent network currency consumption counter according to some embodiments of the present disclosure.

FIG. 4 provides a non-limiting example embodiment of an intelligent network currency consumption counter according to some embodiments of the present disclosure. FIG. 4 illustrates individual bucketization for 4G consumption and 5G consumption where a network currency consumption counter is shared for each network. The disclosed systems and methods provide a "common" counter for a subscriber's network experience (5G and/or 4G data tracking for a period of time).

In some embodiments, the common network consumption counter for a subscriber is provisioned only in CHF at a predetermined amount (e.g., 20 GB). In some embodiments, incoming consumptions are segregated based on 4G and 5G interfaces.

For example, a sample use case is depicted for a sample set of days: day 0, item 402; day 5, item 404; and day 15, item 406 for a cycle of a subscriber's service. In this example, the common counter is 20 GB, where 10 GB is allocated to each network, respectively.

On day 0, item 402, no data is being consumed or tracked. At day 5, item 404, each network has realized a 5 GB consumption record (total of 10/20 GB). On day 15, item 406, the subscriber has consumed 10 GB on the 4G network, and 5 GB on the 5G network (total of 15/20 GB).

As discussed above, without implementing the disclosed functionality and configuration of systems 600/700, on day 15, item 406, when the subscriber reaches the 4G consumption limit of 10 GB, the subscriber's 5G speed (and in some embodiments, 4G speeds) may be deprioritized. This may occur in existing systems despite there still being available consumption overall as well as under the 5G network.

However, based on the functionality provided by the CHF dictating consumption records in accordance with the disclosed systems and methods discussed herein, there is no speed deprioritization until the common counter is exhausted. That is, only when the remaining 5 GB left on the counter (from day 15, item 406) is consumed may the subscriber's speed be deprioritized.

For example, for a 30 day service period, the subscriber would have 15 days remaining to use the 5 GB before his/her speeds may be deprioritized. Should the subscriber not reach the 20 GB counter limit, then on day 31, the service period resets back to "day 0" and the full data consumption limit becomes available again.

In some embodiments, when a subscriber is involved in a fallback session, and is regulated to 4G connectivity, regardless of the reason, the common counter for network data consumption may be tolled (either for a time period or until 5G connectivity is available again). Thus, in some embodiments, their activity on the 4G network does not count towards their quota for the time period (e.g., the available data to them for a service time period—for example, one month). This embodiment is also applicable to the shared bucketization discussed below in relation to FIG. 5.

Figure 5:
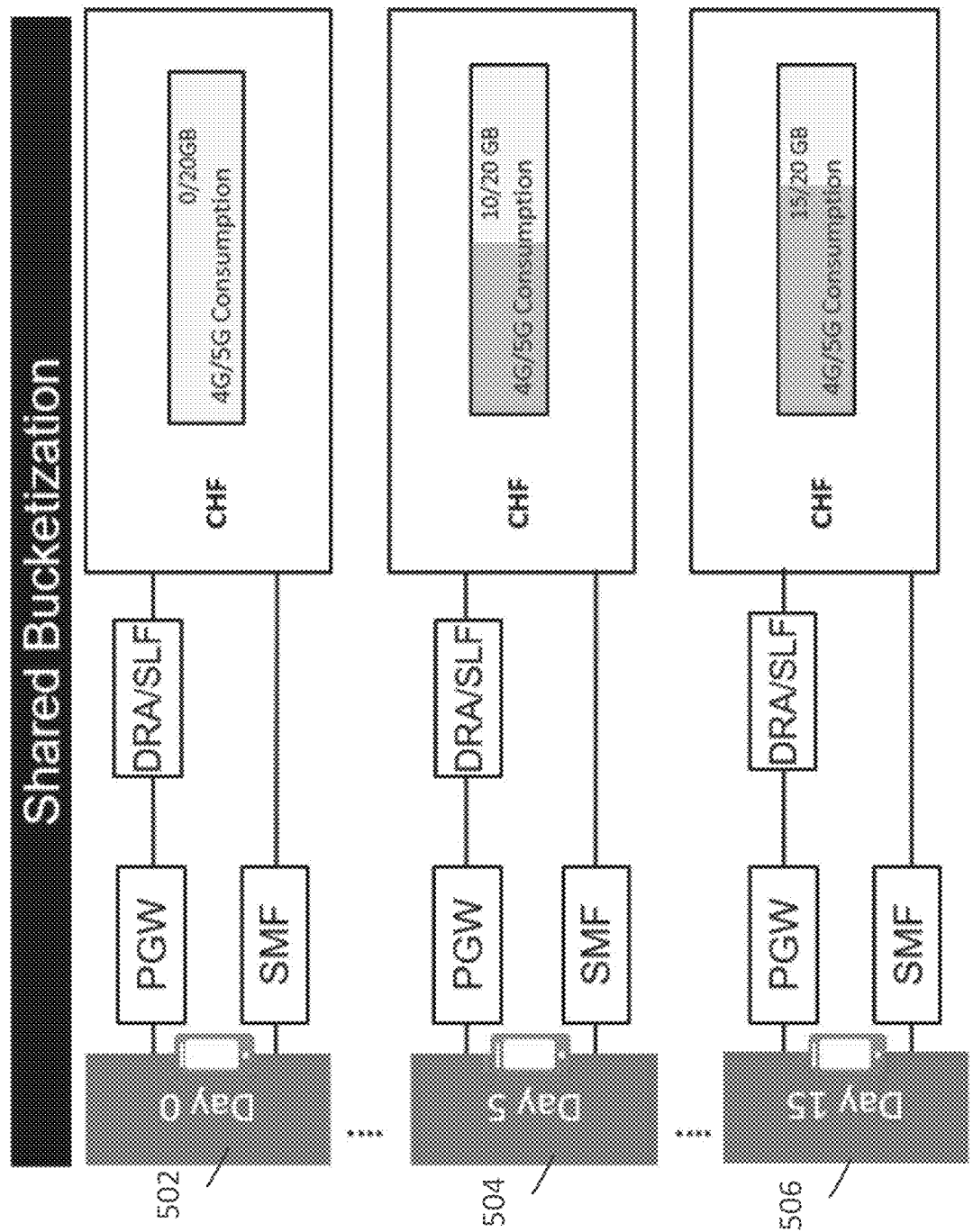
FIG. 5 illustrates an example embodiment of an intelligent network currency consumption counter according to some embodiments of the present disclosure.

FIG. 5 provide a non-limiting example of shared bucketization. Rather than having individual buckets for a 4G and 5G network, here each network shares the same bucket. This provides similar functionality to the bucketing discussed above in FIG. 4; yet, adds functionality for incoming consumptions to be bucketed into a common bucket.

For example, in a similar manner as discussed above in relation to FIG. 4, a sample use case is depicted for a sample set of days: day 0, item 502; day 5, item 504; and day 15, item 506 for a cycle of a subscriber's service. In this example, the common, shared consumption counter is 20 GB.

On day 0, item 502, no data is being consumed or tracked. At day 5, item 504, a total of 10 GB has been consumed on at least one of the 4G and 5G networks. On day 15, item 506, the subscriber has consumed a total of 15 GB on at least one of the 4G and 5G networks.

Thus, in a similar manner as discussed above, there may be no speed deprioritization until the common counter is exhausted. For example, only when the remaining 5 GB left on the counter (from day 15, item 506) is consumed would the subscriber's speed be deprioritized.

Figure 6:
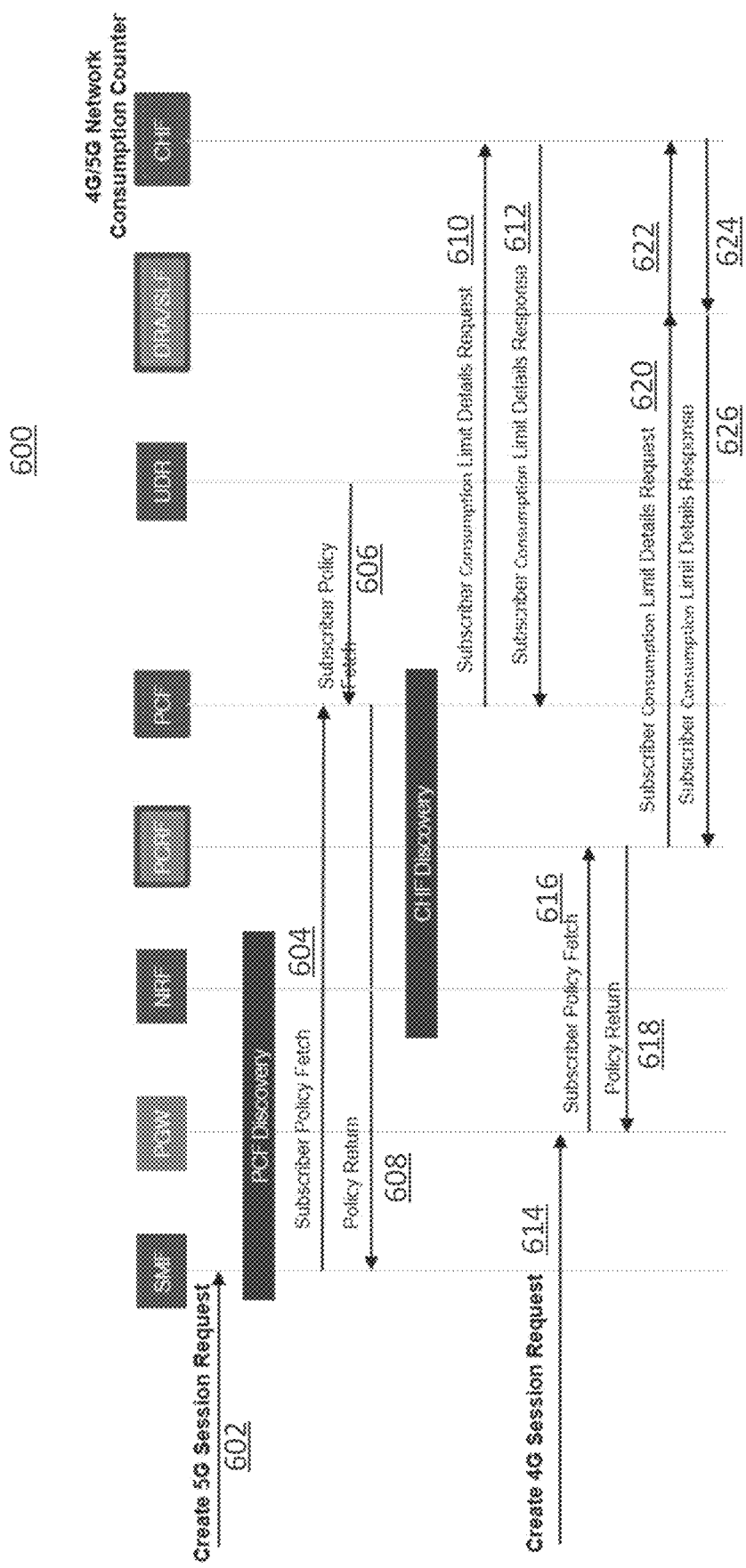
FIG. 6 illustrates an example embodiment of policy management according to some embodiments of the present disclosure.

FIG. 6 illustrates an example embodiment of policy management 600 according to some embodiments of the present disclosure. Policy Management 600 begins with the creation of a 5G session request (602), which as illustrated in FIG. 6, is communicated to the SMF, which then performs the PCF discovery. This involves a 5G session policy fetch which is communicated to the PCF (604). In response, the Unified data repository (UDR) fetches the subscriber's 5G policy data (606), which the PCF then communicates back to the SMF (608).

Policy Management 600 then performs CHF discovery for the 5G session, which involves the PCF sending a 5G subscriber consumption limit details request to the CHF (610). In response, the CHF sends the PCF a 5G subscriber consumption limit details response (612). The 5G subscriber consumption limit details includes information related to available bandwidth for the subscriber, amount of upload and download speeds, and consumption availability, as discussed above.

Policy Management 600 also involves the creation of a 4G session (614) (e.g., a fallback session, as discussed above). Here, a 4G subscriber policy request is sent by the PGW to the PCRF (616), where a policy return is provided accordingly (618). The PCRF then sends a 4G subscriber consumption limit details request to the DRA/SLF (620), which relays this to the CHF (622). The CHF then sends the DLA/SLF a 4G subscriber consumption limit details response (624), which is then relayed back to the PCRF (626). In a similar manner to the 5G subscriber consumption limit details, the 4G subscriber consumption limit details includes information related to available bandwidth for the subscriber, amount of upload and download speeds, and consumption availability. In some embodiments, the consumption limit details discussed herein can indicate a spending limit as a counter value, which the PCF translates to a QoS.

Figure 7:
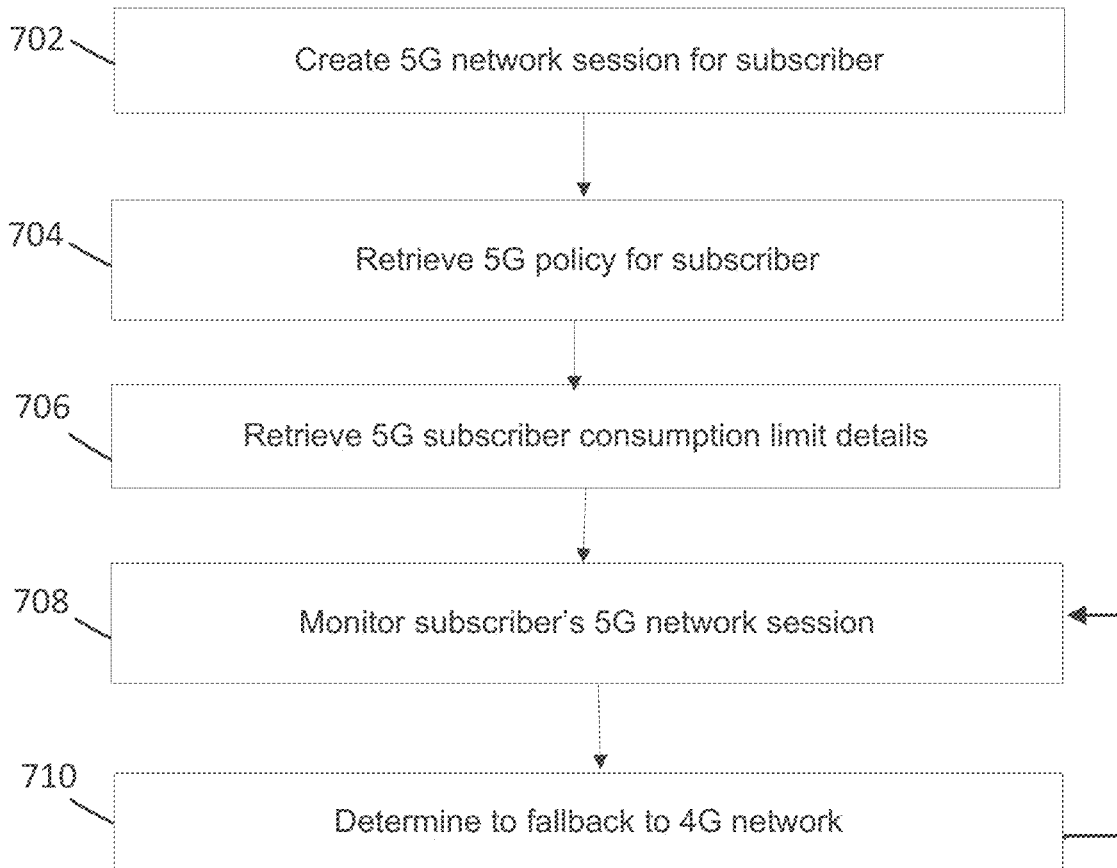
FIG. 7 illustrates an exemplary data flow for network steering for a fallback session according to some embodiments of the present disclosure.

Turning to FIG. 7, Process 700 provides an exemplary data flow for network steering for a fallback session according to some embodiments of the present disclosure. Process 700 is a data flow of the operations performed according to policy management 600 of FIG. 6 discussed above.

Process 700 begins with Step 702 where a 5G network session for a subscriber is created or initiated. In some embodiments, this can be in accordance with, but not limited to, a subscriber signing up for a service plan, a new service period beginning, a user entering (or re-entering) a geographic location where 5G network connectivity is available, a subscriber switching to or using a 5G device for his/her service, and the like, or some combination thereof.

According to some embodiments, the creation of the 5G session involves the identification and allocation of a common network currency consumption counter. In some embodiments, the counter can be identified as part of the policy identified in Step 704 (or the consumption limit details of Step 706). As discussed above in FIG. 8, this counter can be in relation to individualized buckets for 4G and 5G networks, with a shared/common counter; or, as discussed above in relation to FIG. 7, the counter can be in relation to a shared bucket with a shared/common counter.

In Step 704, a 5G policy for the subscriber is retrieved. The retrieval is performed in a similar manner as discussed above in relation to FIG. 6. In some embodiments, the policy corresponds to an account of a person (who can use any device), and in some embodiments, the policy corresponds to a specific device of the person (e.g., his/her smartphone).

In Step 706, 5G subscriber consumption limit details are retrieved. The retrieval is performed in a similar manner as discussed above in relation to FIG. 6. For example, as mentioned above, the 5G subscriber consumption limit details can correspond to a data consumption limit, which is an amount of data a subscriber is capable of consuming via their UE for a given time period (e.g., a service period) before their speeds are deprioritized (e.g., throttled).

For example, as discussed above in relation to FIGS. 4 and 5, a consumption limit detail can indicate a maximum value of data available for to be consumed—for example, 20 GB over 4G and 5G networks (as a shared counter).

Figure 8:
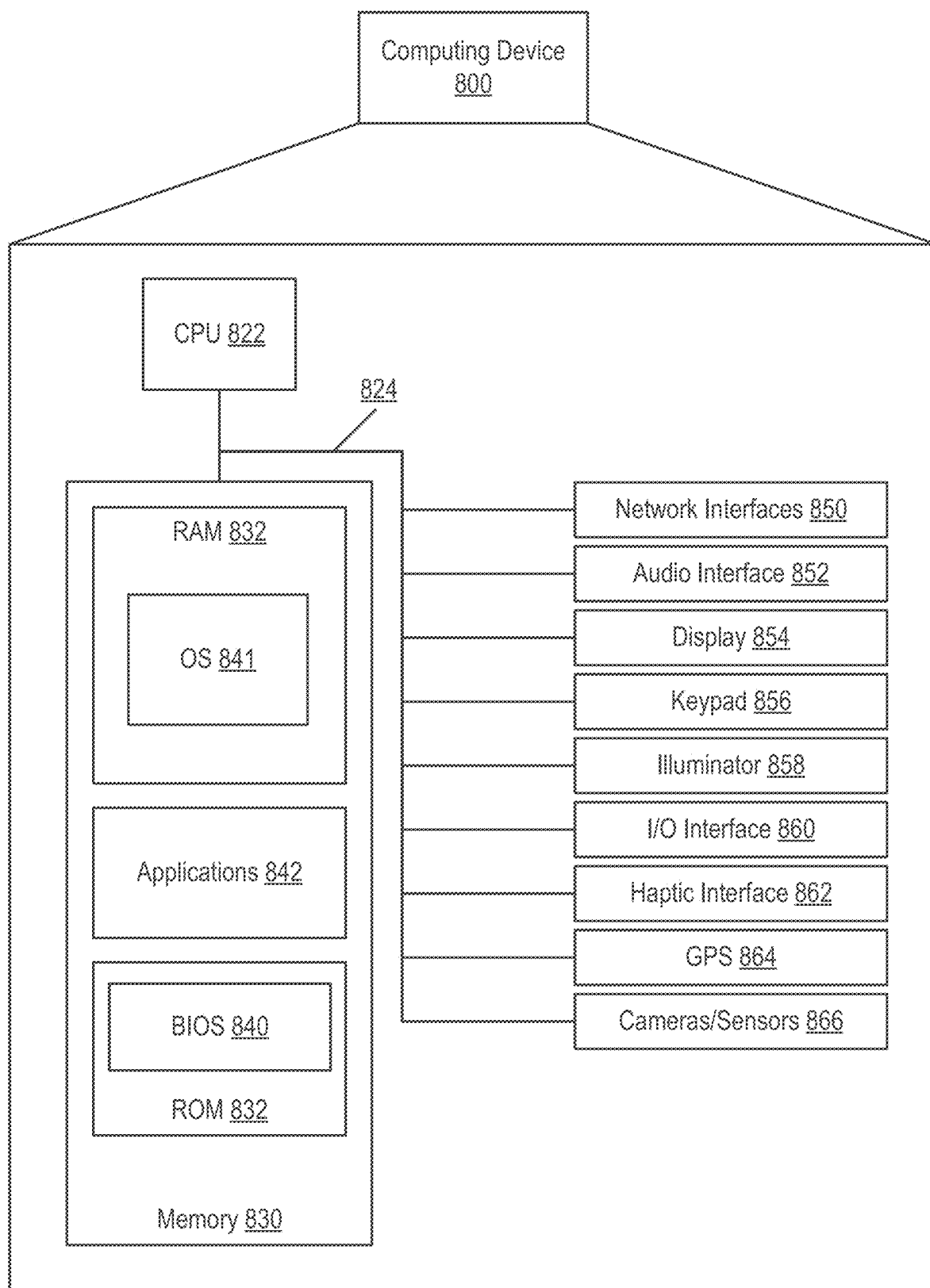
FIG. 8 is a block diagram illustrating a computing device showing an example of a client or server device used in various embodiments of the present disclosure.

In Step 708, the subscriber's 5G network activity is monitored. An example of such monitoring is illustrated in FIGS. 8 and 9, as discussed above. In some embodiments, the monitoring involves tracking the network data consumption of the subscriber under the 5G and 4G networks, as discussed herein.

According to some embodiments, the monitoring can involve analyzing a subscriber's network activity to determine whether a criteria has been satisfied that causes a fallback session to be instituted. The criteria can include, inter alia, whether 5G coverage is available, whether certain limits of data consumption have been satisfied (e.g., has 20 GB of data been consumed, or has 10 GB allotted to the 5G Core been used), and the like, or some combination thereof.

Should the monitoring result in any of the above conditions where 5G connectivity is no longer available (e.g., no 5G coverage based on a user's location, and/or the subscriber has reached a counter limit on data consumption for the 5G Core), then Process 700 proceeds to Step 710, where a fallback session is instituted. The fallback session corresponds to the subscriber being provided 4G network connectivity in accordance with the remaining/available currency counter consumption availability. The fallback session is instituted and performed in a similar manner as discussed above in relation to FIG. 6's disclosure of the 4G session request creation.

In some embodiments, rather than initiating the 4G session at the time of the fallback session determination (e.g., Step 710), Step 702 may further include initiating a 4G session in addition to the 5G session. This can occur at a time proximate to the 5G session's institution (e.g., at the same time or within a threshold amount of time from the 5G session request or its institution). This can streamline the network offloading occurring as the connection may already be established and awaiting the subscriber's connection to apply the 4G policy in accordance with the 4G consumption limit details.

In some embodiments, Process 700 recursively proceeds from Step 710 to Step 708 to monitor activity on the 4G network, and to further monitor the availability of the 5G network. In some embodiments, should the 5G network become available again, the subscriber can be reallocated to the 5G network (e.g., when a subscriber re-enters a region where 5G is available).

FIG. 8 is a block diagram illustrating a computing device showing an example of a client or server device used in the various embodiments of the disclosure.

The computing device 800 may include more or fewer components than those shown in FIG. 8, depending on the deployment or usage of the device 800. For example, a server computing device, such as a rack-mounted server, may not include audio interfaces 852, displays 854, keypads 856, illuminators 858, haptic interfaces 862, GPS receivers 864, or cameras/sensors 866. Some devices may include additional components not shown, such as graphics processing unit (GPU) devices, cryptographic co-processors, artificial intelligence (AI) accelerators, or other peripheral devices.

As shown in FIG. 8, the device 800 includes a central processing unit (CPU) 822 in communication with a mass memory 830 via a bus 824. The computing device 800 also includes one or more network interfaces 850, an audio interface 852, a display 854, a keypad 856, an illuminator 858, an input/output interface 860, a haptic interface 862, an optional global positioning systems (GPS) receiver 864 and a camera(s) or other optical, thermal, or electromagnetic sensors 866. Device 800 can include one camera/sensor 866 or a plurality of cameras/sensors 866. The positioning of the camera(s)/sensor(s) 866 on the device 800 can change per device 800 model, per device 800 capabilities, and the like, or some combination thereof.

In some embodiments, the CPU 822 may comprise a general-purpose CPU. The CPU 822 may comprise a single-core or multiple-core CPU. The CPU 822 may comprise a system-on-a-chip (SoC) or a similar embedded system. In some embodiments, a GPU may be used in place of, or in combination with, a CPU 822. Mass memory 830 may comprise a dynamic random-access memory (DRAM) device, a static random-access memory device (SRAM), or a Flash (e.g., NAND Flash) memory device. In some embodiments, mass memory 830 may comprise a combination of such memory types. In one embodiment, the bus 824 may comprise a Peripheral Component Interconnect Express (PCIe) bus. In some embodiments, the bus 824 may comprise multiple busses instead of a single bus.

Mass memory 830 illustrates another example of computer storage media for the storage of information such as computer-readable instructions, data structures, program modules, or other data. Mass memory 830 stores a basic input/output system ("BIOS") 840 for controlling the lowlevel operation of the computing device 800. The mass memory also stores an operating system 841 for controlling the operation of the computing device 800.

Applications 842 may include computer-executable instructions which, when executed by the computing device 800, perform any of the methods (or portions of the methods) described previously in the description of the preceding Figures. In some embodiments, the software or programs implementing the method embodiments can be read from a hard disk drive (not illustrated) and temporarily stored in RAM 832 by CPU 822. CPU 822 may then read the software or data from RAM 832, process them, and store them to RAM 832 again.

The computing device 800 may optionally communicate with a base station (not shown) or directly with another computing device. Network interface 850 is sometimes known as a transceiver, transceiving device, or network interface card (NIC).

The audio interface 852 produces and receives audio signals such as the sound of a human voice. For example, the audio interface 852 may be coupled to a speaker and microphone (not shown) to enable telecommunication with others or generate an audio acknowledgment for some action. Display 854 may be a liquid crystal display (LCD), gas plasma, light-emitting diode (LED), or any other type of display used with a computing device. Display 854 may also include a touch-sensitive screen arranged to receive input from an object such as a stylus or a digit from a human hand.

Keypad 856 may comprise any input device arranged to receive input from a user. Illuminator 858 may provide a status indication or provide light.

The computing device 800 also comprises an input/output interface 860 for communicating with external devices, using communication technologies, such as USB, infrared, Bluetooth™, or the like. The haptic interface 862 provides tactile feedback to a user of the client device.

The optional GPS transceiver 864 can determine the physical coordinates of the computing device 800 on the surface of the Earth, which typically outputs a location as latitude and longitude values. GPS transceiver 864 can also employ other geo-positioning mechanisms, including, but not limited to, triangulation, assisted GPS (AGPS), E-OTD, CI, SAI, ETA, BSS, or the like, to further determine the physical location of the computing device 800 on the surface of the Earth. In one embodiment, however, the computing device 800 may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
   tracking, by a core component of a fifth-generation (5G) network, network data consumption of an account of a subscriber in connection with a 5G session of the subscriber, wherein the tracking is based on a data counter that has a limit based on data consumption details;
   making, by the core component of the 5G network, a fallback session determination to institute a fallback session, the fallback session corresponding to offloading the subscriber from the 5G network to a fourth-generation (4G) network;
   causing, by the core component of the 5G network, a core component of the 4G network to provide 4G network connectivity to the subscriber in accordance with the fallback session determination; and
   monitoring, by the core component of the 5G network, 4G data consumed by the subscriber in accordance with the network consumption counter.

2. The method of claim 1, wherein the fallback session determination to institute a fallback session is based on the tracking of the data consumption details of the subscriber.

3. The method of claim 1, wherein the fallback session determination to institute a fallback session is based on 5G connectivity becoming unavailable to the subscriber.

4. The method of claim 1, wherein the core component of the 5G network is a charging function (CHF) and the core component of the 4G network is a Diameter Routing Agent/Subscriber Location Function (DRA/SLF).

5. The method of claim 4, wherein the DRA/SLF implements diameter signaling of received data from at least one other core component of the 4G network, and communicates with the CHF based on the received data and diameter signaling.

6. The method of claim 1, further comprising:
   receiving, by the core component of the 5G network, from a policy control function (PCF) a request for 5G consumption limit details for the subscriber; and
   providing, by the core component of the 5G network, to the PCF, the requested 5G consumption limit details for the subscriber.

7. The method of claim 1, further comprising:
   receiving, by the core component of the 5G network, from the core component of the 4G network, a request for 4G consumption limit details for the subscriber; and
   providing, by the core component of the 5G network, to the core component of the 4G network, the requested 4G consumption limit details for the subscriber, wherein the core component of the 4G network sends the 4G consumption limit details to a policy and charging rules function (PCRF) of the 4G network.

8. The method of claim 1, wherein a 4G session request is based on the fallback session determination.

9. The method of claim 1, wherein a 4G session request is performed at a time proximate to creation of the 5G session.

10. The method of claim 1, wherein the data counter is configured with individualized data storage structures for data consumption tracking of the 5G data and the 4G data, with a shared counter.

11. The method of claim 1, wherein the data counter is configured with a shared data storage structure for data consumption tracking of the 5G data and the 4G data, with a shared counter.

12. The method of claim 1, further comprising:
   determining that the data consumption limit of the data counter has reached its maximum level based on the 5G and 4G data of the subscriber; and
   deprioritizing network speed of the subscriber based on the maximum level determination.

13. A device comprising:
   a processor configured to:
   track, by a core component of a fifth-generation (5G) network, network data consumption of an account of a subscriber in connection with a 5G session of the subscriber, wherein the tracking is based on a data counter that has a limit based on data consumption details;
   make, by the core component of the 5G network, a fallback session determination to institute a fallback session, the fallback session corresponding to offloading the subscriber from the 5G network to a fourth-generation (4G) network;
   cause, by the core component of the 5G, a core component of the 4G network to provide 4G network connectivity to the subscriber in accordance with the fallback session determination; and
   monitor, by the core component of the 5G network, 4G data consumed by the subscriber in accordance with the network consumption counter.

14. The device of claim 13, wherein the fallback session determination to institute a fallback session is based on the tracking of the data consumption details of the subscriber.

15. The device of claim 13, wherein the fallback session determination to institute a fallback session is based on 5G connectivity becoming unavailable to the subscriber.

16. The device of claim 13, wherein the core component of the 5G network is a charging function (CHF) and the core component of the 4G network is a Diameter Routing Agent/Subscriber Location Function (DRA/SLF).

17. A non-transitory computer-readable medium tangibly encoded with instructions, that when executed by a processor, perform a method comprising:
- tracking, by a core component of a fifth-generation (5G) network, network data consumption of an account of a subscriber in connection with a 5G session of the subscriber, wherein the tracking is based on a data counter that has a limit based on data consumption details;
- making, by the core component of the 5G network, a fallback session determination to institute a fallback session, the fallback session corresponding to offloading the subscriber from the 5G network to a fourth-generation (4G) network;
- causing, by the core component of the 5G network, a core component of the 4G network to provide 4G network connectivity to the subscriber in accordance with the fallback session determination; and
- monitoring, by the core component of the 5G network, 4G data consumed by the subscriber in accordance with the network consumption counter.

18. The non-transitory computer-readable medium of claim 17, wherein the fallback session determination to institute a fallback session is based on the tracking of the data consumption details of the subscriber.

19. The non-transitory computer-readable medium of claim 17, wherein the fallback session determination to institute a fallback session is based on 5G connectivity becoming unavailable to the subscriber.

20. The non-transitory computer-readable medium of claim 17, wherein the core component of the 5G network is a charging function (CHF) and the core component of the 4G network core component is a Diameter Routing Agent/Subscriber Location Function (DRA/SLF).

* * * * *